United States Patent
Badger et al.

[11] Patent Number: 6,055,527
[45] Date of Patent: Apr. 25, 2000

[54] SYSTEM, METHOD AND COMPUTER PROGRAM PRODUCT FOR SUPERIMPOSING ATTRIBUTES ON HIERARCHICALLY ORGANIZED FILE SYSTEMS

[75] Inventors: M. Lee Badger, Rockville; Daniel F. Sterne, Ellicott City; David L. Sherman, Mount Airy; Homayoon Tajalli, Ellicott City; David I. Dalva, Rockville, all of Md.

[73] Assignee: Network Associates, Inc., Santa Clara, Calif.

[21] Appl. No.: 09/074,467

[22] Filed: May 8, 1998

Related U.S. Application Data

[63] Continuation of application No. 08/475,991, Jun. 7, 1995, Pat. No. 5,819,275.

[51] Int. Cl.[7] .................................................. G06F 17/30
[52] U.S. Cl. ........................... 707/2; 707/100; 707/203; 707/1; 707/200
[58] Field of Search ............................. 707/100, 2, 203, 707/1, 200

[56] References Cited

U.S. PATENT DOCUMENTS

| | | | |
|---|---|---|---|
| 5,218,696 | 6/1993 | Baird et al. | 707/1 |
| 5,499,358 | 3/1996 | Nevarez | 707/101 |
| 5,742,817 | 4/1998 | Pinkoski | 707/200 |
| 5,819,275 | 10/1998 | Badger et al. | 707/100 |

*Primary Examiner*—Anton W. Fetting
*Assistant Examiner*—Greta Robinson
*Attorney, Agent, or Firm*—Pennie & Edmonds LLP

[57] ABSTRACT

A method for superimposing attributes on files stored in a hierarchically organized file system, having at least one file and at least one directory, is disclosed. The method initializes an attribute data base (ADB) with one or more entries having a path descriptor referencing a file in a hierarchical database, an attribute, and an attribute association option describing how the attribute is associated with the file referenced by the path descriptor. The method simplifies maintaining systems employing file attributes to describe files by using the hierarchy of the file system to superimpose attributes on the files. The method provides for handling explicit, implicit, and static associations of attributes with files in the file hierarchy. The method is invoked by a file manager, such as an attribute supplying file hierarchy (ASFH), which resides in the operating system of a computer system having a processor, memory, and a system bus for passing data between the processor and memory. The method can be part of a Hierarchical Attribute Superimposition Subsystem (HASS) which includes an ADB and an ASFH.

17 Claims, 15 Drawing Sheets

| ATTRIBUTE 402 | ASSOCIATION OPTION 702 | PATH DISCRIPTOR 1100 |
|---|---|---|
| attr1, attr2 | EXPLICIT | /1411 |
| attr1 | EXPLICIT | /1411/1412 |
| attr1, attr2, attr4 | IMPLICIT | /1411/1412 |
| attr1, attr4 | EXPLICIT | /1411/1412/1402 |
| attr1, attr3 | IMPLICIT | /1411/1412/1413 |
| attr1, attr2, attr3 | EXPLICIT | /1411/1412/1413/1405 |
| attr1 | EXPLICIT | /1411/1412/1413/1414 |

FIG.15

SYSTEM, METHOD AND COMPUTER PROGRAM PRODUCT FOR SUPERIMPOSING ATTRIBUTES ON HIERARCHICALLY ORGANIZED FILE SYSTEMS

This application is a continuation application of and claims priority to U.S. Non-Provisional application Ser. No. 08/475,991filed Jun. 7, 1995 now U.S. Pat. No. 5,819,275.

BACKGROUND OF THE INVENTION

1. Field of the Invention

The present invention relates generally to data file storage subsystems, and more particularly to a system and method for superimposing attributes on hierarchically organized file systems.

2. Related Art

Data processing systems generally store data in file systems containing groups of data files that are hierarchically organized using directories. A file system is a collection of directories and files, and their associated attributes. The directories and files reside on a single device and are linked together by directory entries. Files and file systems may exist on a wide variety of physical media including rotating disks, drums, random access memory, optical disks, and the like. In some data processing systems, individual files may be accessed by multiple hardlinks. A hardlink is a file name and an offset, or index, into a storage medium on which files reside. The offset is the address of the file on the storage medium. By associating an arbitrary file name with a particular offset, the same file may be accessed by different names. Identifying the same file by different names is known as aliasing. Aliasing is accomplished by using multiple hardlinks to the file. That is, a single physical file may be referenced by multiple names, each said name having the same offset into the storage medium.

To organize file systems in a meaningful way, data processing systems often maintain attributes for each file. Attributes store information about the file such as its size, the date it was last modified, and its owner. On conventional systems, file attributes are typically stored as fields in a file's data format. Thus, each file includes one or more fields containing attributes associated with that file. Although files may have identical attributes, the conventional attribute association mechanism stores a copy of the attribute for each file. Several conventional attribute association techniques are currently in use. They shall now be described.

UNIX systems generally store file attributes on a one-to-one basis with the files they describe. For example, UNIX file attributes, such as user id, protection bits, group id, and creation time, are stored in the UNIX on-disk Inode structure. Every file has a complete copy of its attributes. Secure systems employing this technique of file attribute association, such as Trusted Xenix and Trusted Mach, produced by Trusted Information Systems, store security level attributes on a one-to-one basis with the labeled objects. In addition, UNIX systems generally provide at least one global file system attribute that applies to all files in a file system. For example, the read only status flag is a global attribute that is either on or off.

In the well known Andrew File System (AFS), every directory has an Access Control List (ACL). The ACL applies to the directory and each file contained therein. When a file is moved to a new directory, its access rights are changed to those of the new directory. AFS suffers from several deficiencies. In order to avoid confusion about which directory's ACL to inherit, AFS does not allow multiple hardlinks from different directories to a particular file. Furthermore, in order to provide a simple mechanism for avoiding cycles within a file hierarchy, AFS does not allow hardlinks to directories.

Windows 95 is reported to employ a scheme to store long filenames in DOS FAT file systems. To maintain data compatibility with DOS systems, Windows 95 does not modify the FAT format. Rather, it saves long filenames in a supplemental storage area. This supplemental storage area stores a long filename in a one-to-one manner with a corresponding file. Moreover, FAT file systems do not support multiple hardlinks.

Several add-on packages for DOS provide encryption below certain directories. However, such systems do not provide a capability to incorporate multiple hardlinks.

A specific deficiency of the current art is that conventional hierarchically organized file systems store file attributes on a one-to-one basis with files. Modern data processing systems store tremendous numbers of files organized in complex storage schemes. As a result, attributes associated with files on a one-to-one basis in such systems are extremely difficult for human administrators to collect, understand, and change. Accordingly, what is needed is a way to store such attributes in a manner that is concise, simple, easily understandable, and not limited to a one-to-one paradigm.

In addition, the current art does not provide a way to add new file attributes in a concise, easily understandable way that is compatible with existing file systems or applications interacting with files in those existing file systems. This is a significant deficiency since many existing systems will ultimately incorporate new security features. Such features will require the addition of new file attributes in a manner that is easy for a human to understand.

Thus, what is required is a system and method for arbitrarily associating attributes with files and directories in a concise, easily understandable manner while maintaining compatibility with existing file systems and applications which interact with files in existing file systems. The resulting system and method must be easy to use and easy to implement in current and future data processing systems. Moreover, the system must be capable of supporting multiple hardlinks.

SUMMARY OF THE INVENTION

The present invention overcomes the aforementioned deficiencies of conventional computer systems through a novel system and method of associating attributes with files stored in hierarchically organized file systems. Because the invention does not alter media formats or file contents, it maintains compatibility with existing file systems and applications interacting with files in those existing file systems. The invention is not limited to the one-to-one storage strategy used by conventional systems. This is because it uses the hierarchical organization of file systems to associate one physical copy of an attribute with one or more files. That is, the invention employs the concept of "implicit binding." An advantage of implicit binding is that it reduces the system resources required for storing file attributes. Moreover, implicit binding of attributes with files allows the representation of the bindings to be much more concise and simple. This feature of the present invention facilitates human administration of attribute bindings. Moreover, the present invention is capable of associating attributes with files which are accessed by different names. Thus, the present invention is capable of associating attributes with files even though the files have multiple hardlinks to them.

The present invention operates as follows. The invention associates an attribute data base (ADB) with an attribute supplying file hierarchy (ASFH). The ADB comprises one or more arbitrary associations of attributes with files. The ASFH represents a hierarchical organization of files on a particular storage medium. A Hierarchical Attribute Superimposition Subsystem (HASS) is the composition of one or more ASFHs with an ADB. The invention receives a HASS operation request containing one or more parameters. If the received operation request is a file_create( ) operation, the invention creates the file in the ASFH and updates the ADB. If the received operation request is a link_create( ) operation, the invention creates a link in the ASFH and updates the ADB. If the received operation request is a link_delete( ) operation, the invention deletes the link from the ASFH. If the received operation is a get_attributes( ) operation, the invention retrieves the appropriate attributes. After, processing a received operation, the invention waits for the next HASS operation to process.

A HASS according to the present invention provides at least the following advantages: compatibility, ease of configuration, simplicity, performance, and flexibility. A HASS according to the present invention maintains compatibility with both existing data formats and with existing programs that access files within an ASFH. It integrates the storage and management of attributes into one place that can be easily altered by human administrators or by system utilities. Thus, the present invention eases system configuration. In terms of simplicity, a HASS according to the present invention organizes attributes using file system hierarchies which are visible to, and well understood by, users who need to understand attribute association configurations. The use of a hierarchy allows the representation to be extremely concise. Thus, the present invention allows a human administrator to easily view comprehensive and complex attribute association information. In the absence of a hierarchical representation, such information would be too voluminous for human consumption and understanding. A HASS according to the present invention uses implicit attribute associations. Implicit attribute associations require less space for storing or processing attribute associations than conventional one-to-one attribute association systems. This space efficiency increases performance by reducing the need to access slow secondary media, e.g., disk drives, to retrieve attributes. This space efficiency also increases the flexibility achieved by using attributes. This is because a system according to the present invention can easily change and manipulate attribute associations. A significant use of this flexibility is the use of a HASS to implement "dynamic security policies." Such flexibility is required because "dynamic security policies" often change attribute associations within a running system.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein:

FIG. 15 illustrates the ADB configuration for the file hierarchy illustrated in FIG. 14.

DETAILED DESCRIPTION OF THE PREFERRED EMBODIMENTS

Figure 12:
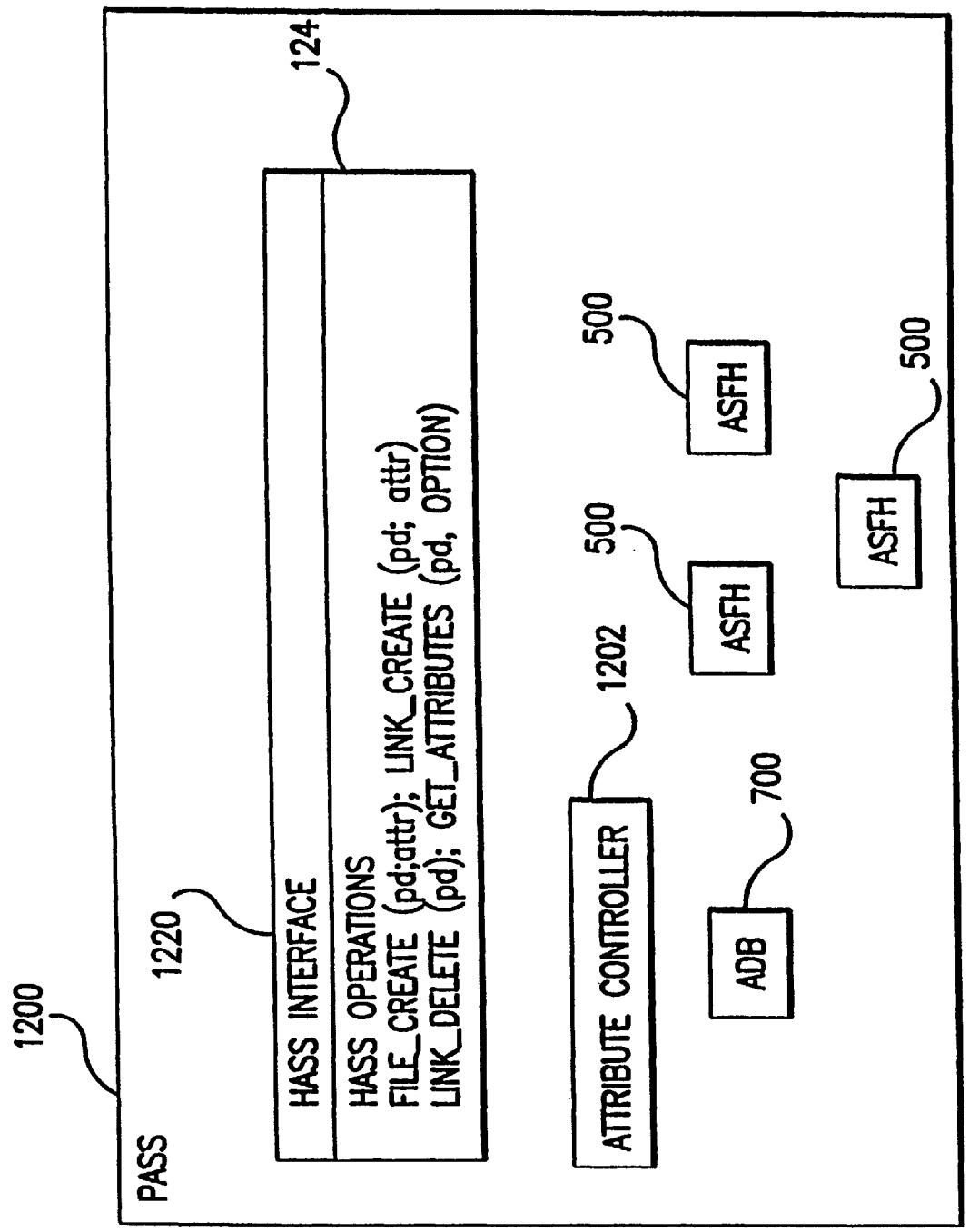
FIG. 12 shows the preferred structure of a HASS.
Figure 13:
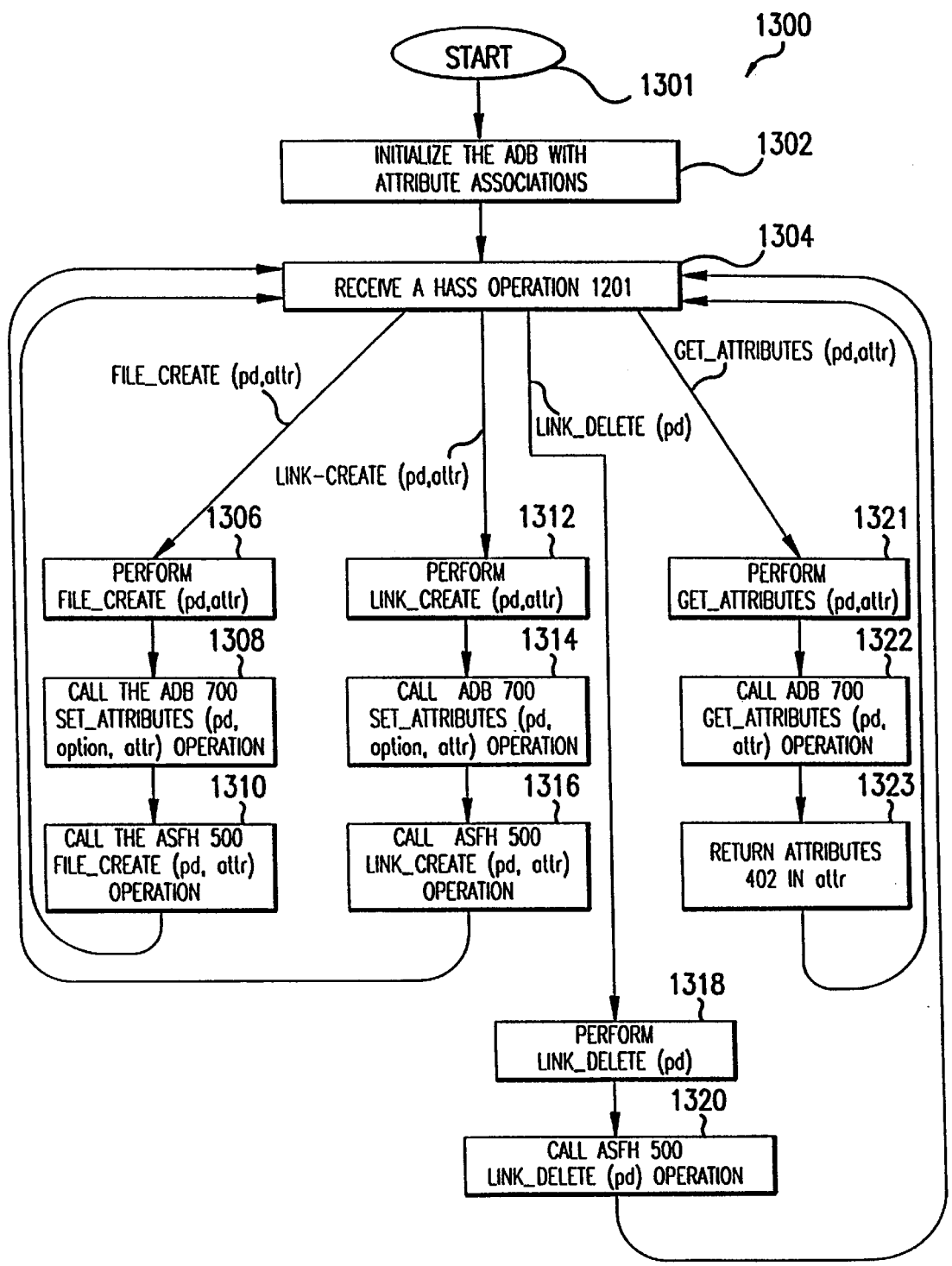
FIG. 13 shows the preferred method of a HASS.

The preferred embodiment of the present invention is generally referred to as a Hierarchical Attribute Superimposition Subsystem (HASS). FIG. 12 shows the general structure of a HASS 1200. FIG. 13 depicts a flowchart 1300 illustrating the preferred method of the HASS 1200. Both figures will be described in detail below. The HASS 1200 provides a mechanism to associate attributes with files in a collection of file systems. Furthermore, it provides a way to add attributes to files stored on computer systems that use hierarchical file systems. The HASS 1200 according to the present invention permits a unique, i.e. different, attribute to be associated with each file in a file system. In addition, it allows groups of files in a file system to share the same attribute. A HASS according to the present invention provides at least the following advantages: compatibility, ease of configuration, simplicity, performance, and flexibility.

Figure 1:
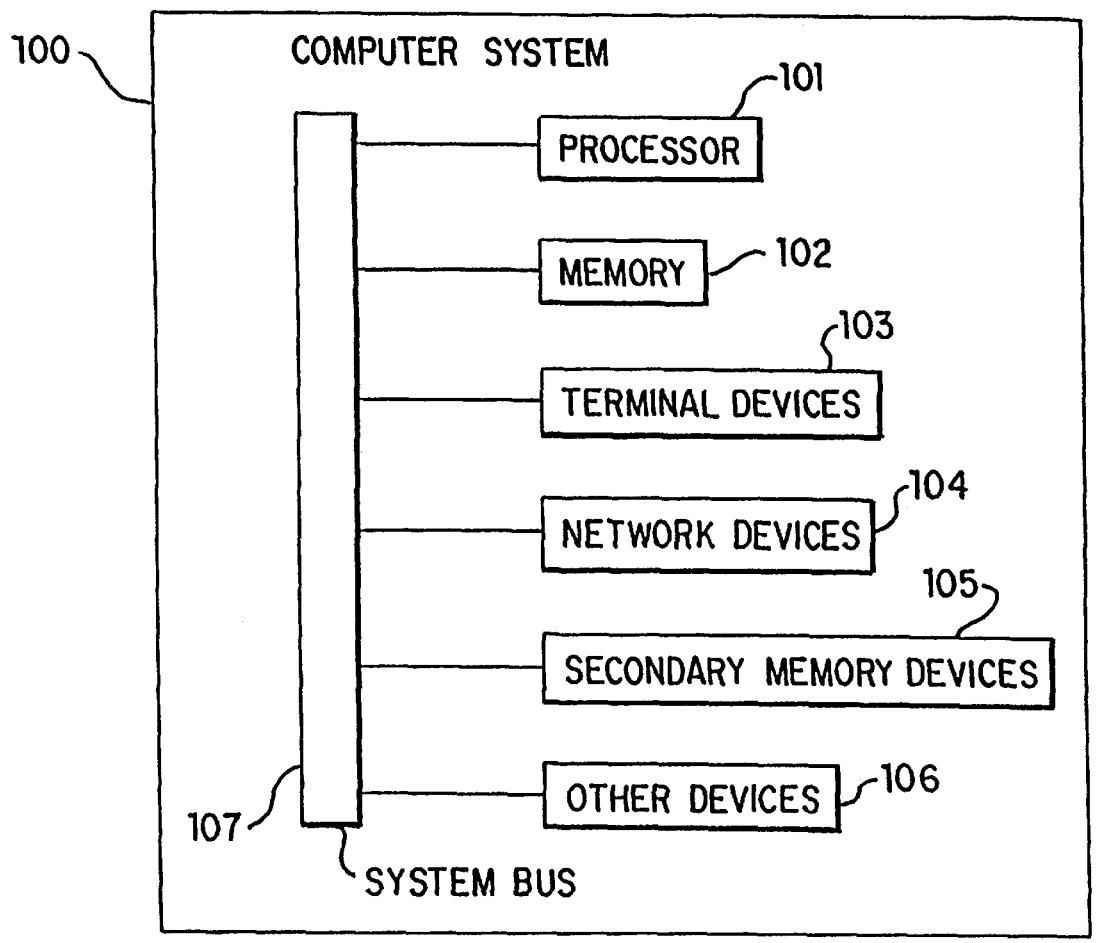
FIG. 1 is a block diagram of a computer system employed by the invention.

FIG. 1 shows a block diagram of a computer system 100 in which the HASS 1200 of the invention may operate. The computer system 100 comprises a processor 101 connected via a system bus 107 to a memory 102. Optional devices in the computer system 100 include one or more terminal devices 103, network devices 104, secondary memory devices 105 and other devices 106. The secondary memory device 105 is generally a disk drive. It would be apparent to a person skilled in the relevant art that the secondary memory device 105 can be implemented using other technologies, e.g., magnetic tape drive, optical disk, etc.

Figure 2:
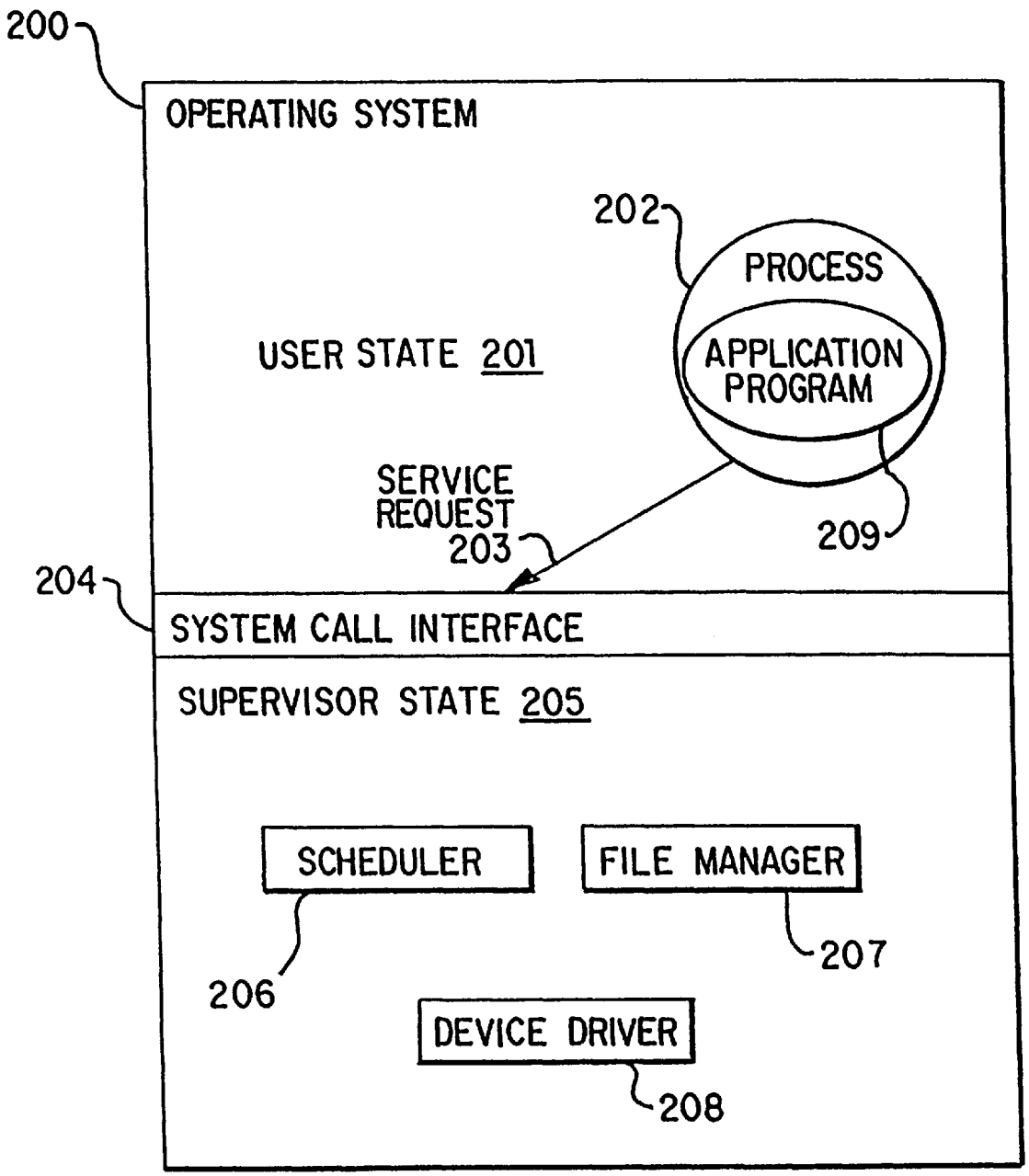
FIG. 2 is a block diagram of a computer operating system employed by the invention.

FIG. 2 shows a block diagram of an operating system 200 that controls the computer system 100. The operating system 200 is a program that resides in memory 102. The operating system 200 regulates the operation of computer system 100. An operating system 200 creates at least one process 202 corresponding to an application program 209. The operating system 200 typically manages at least two processor states;

a user state 201 and a supervisor state 205. When the processor 101 is in the supervisor state 205, it can access any part of memory 102. When the processor is in the user state 201, it can access only a limited portion of memory 102. A service request 203 issued by a process 202 running in the user state 201 transfers control to the operating system 200 and also enters the supervisor state 205. The system call interface 204 constitutes the only way an application program 209 running in the user state 201 can transition to the supervisor state 205. Thus, an application program 209 using the processor 101 and running in the user state 201 must issue a service request 203 to the operating system's system call interface 204 in order to access portions of memory 102 available only in the supervisor state 205.

Operating system 200 provides several fundamental services through its system call interface 204. Such services include scheduling, file management, networking, and inter-process communication. The two most relevant to the present invention are scheduling and file management. A scheduler 206 determines which process 202 may use the processor 101 to issue a service request 203. A file manager 207 manages files that a process 202 may use to store, retrieve, and otherwise manipulate data. Details of the scheduler 206 are not central to this invention. Thus, the scheduler 206 is described only insofar as necessary to understand the present invention. Both the scheduler 206 and the file manager 207 may make use of at least one device driver 208. With respect to the scheduler 206, a device driver 208 may be needed to access a system clock device that informs the operating system about when to allocate the processor 101 to another process 202. With respect to the file manager 207, a device driver 208 is needed to manipulate files stored on secondary memory devices 105 or network devices 104.

Figure 3A:
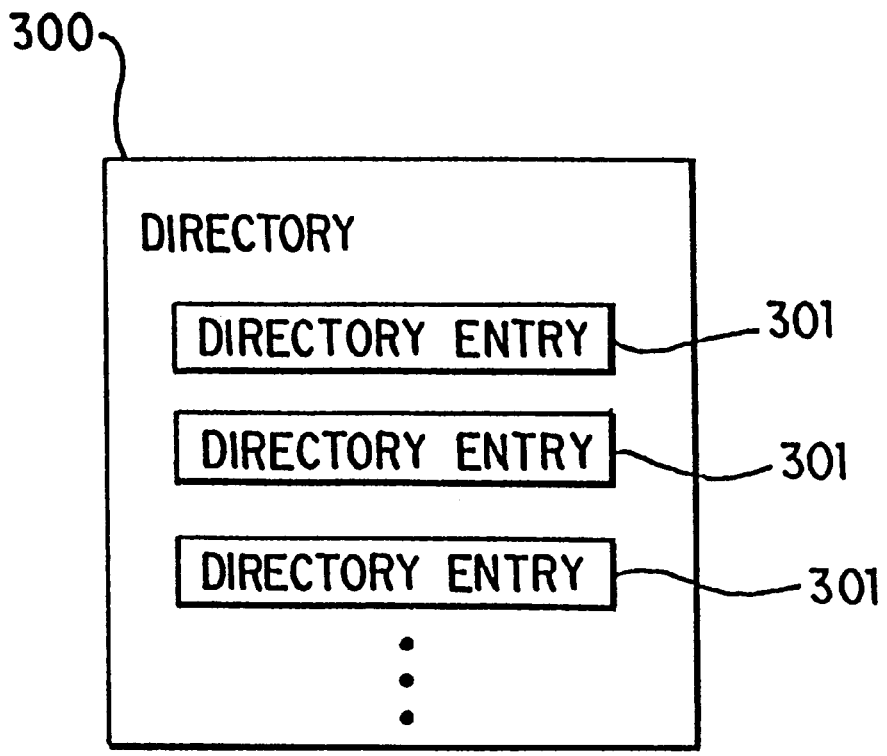
FIG. 3A shows the structure of a directory employed by the invention.
Figure 3B:
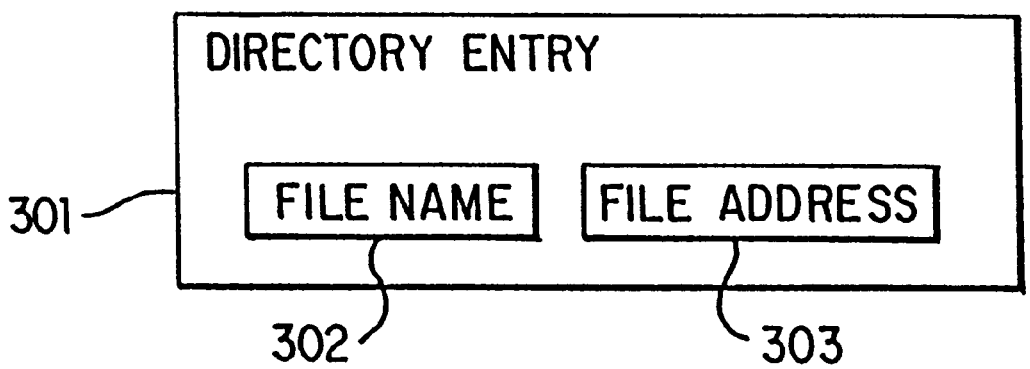
FIG. 3B shows the structure of a directory entry employed by the invention.

The present invention relates to operating systems that use file managers to organize file hierarchies organized as directories. FIG. 3A shows the structure of a directory 300. A directory 300 is a collection of directory entry structures 301. Each directory entry structure 301 contains a file name 302 and a file address 303 as shown in FIG. 3B. A file name 302 is the name that the file has within the directory 300. A file address 303 contains information (i.e., an address) required to locate a file corresponding to the file name 302. A directory 300 may exist either in memory 102 or on secondary memory devices 105 or on network devices 104. The file address 303 therefore provides location information, e.g., a memory pointer or a disk address, suitable to the media on which the directory 300 resides. A directory 300 is itself a kind of file. A directory entry structure 301 may contain a file address 303 that points to another directory 300. By using pointers, directories 300 are interconnected via directory entry structures 301 to form a graph of directories.

In addition to the contents of a directory 300 or file, operating systems generally maintain attributes that further describe a directory or file. Examples of attributes include creation time, last modification time, last accessed time, owner, size, security information, and system-specific information such as a file serial number.

Figure 4A:
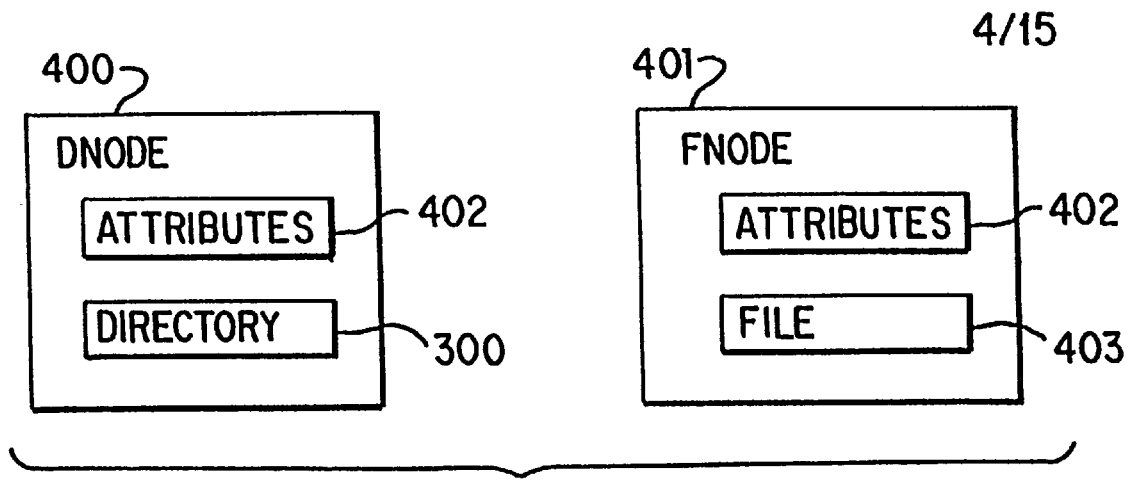
FIG. 4A illustrates an approach for managing files, directories, and their associated attributes.

FIG. 4A illustrates an approach for managing files, directories and their associated attributes. For each directory 300 there is a dnode 400 that contains both the directory 300 and its attributes 402. Similarly, for each file 403 there is an fnode 401 that contains both the file 403 and its attributes 402. The file 403 stores data (such as application user data). The containment relations of FIG. 4A are logical in nature. That is, many systems that implement dnode and fnode structures 400, 401 may distribute the physical manifestations of file data, directory entries, and attributes across numerous disk blocks or segments of memory. Such systems maintain associations between any distributed data representations that have a logical containment relation as depicted in FIG. 4A.

Figure 4B:
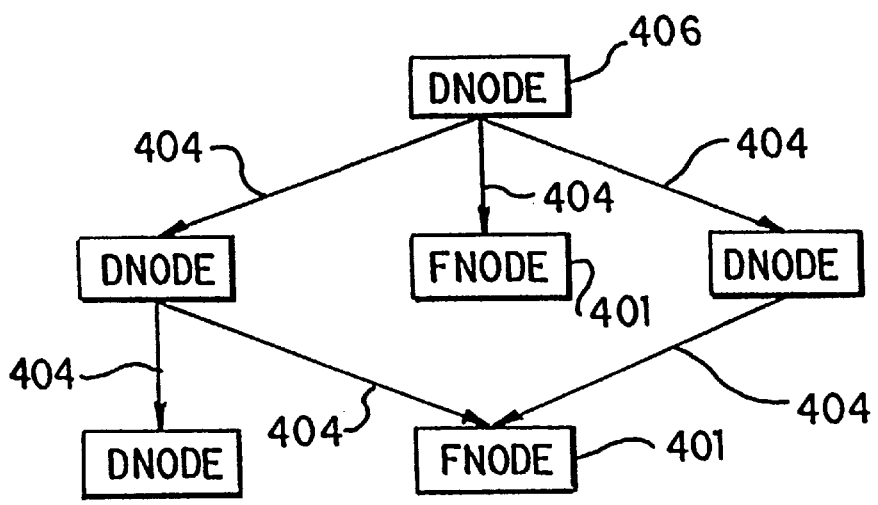
FIG. 4B represents the general structure of a file system.

FIG. 4B represents the general structure of a file system. As shown in FIG. 4B, the general structure of a file system may be thought of as a graph having dnodes 400, 406 and fnodes 401 connected by edges 404. A particular dnode 406 is designated the "root" directory of a file system. A directory entry 301 defines every edge 404 in the graph. Thus, the directories 300 form the hierarchical organization of a file system. File systems reside on a variety of primary and secondary media including RAM, rotating disks, flash memory, etc. The attributes 402 employ operating system 200 specific data formats. The data formats are understandable to the operating system that manages the file system.

According to the present invention, a file 403 or directory 300 can be reached by more than one path from the root directory of the file system. Several conventional file systems do not permit multiple paths to a file. The present invention is not limited by a single path constraint.

The present invention preferably initializes some attributes 402 at file creation. An attribute 402 contains at least one attribute value. An attribute 402 may therefore be implemented as a scalar variable or as a more complex structure. Attributes 402 are initialized during system initialization for existing files and thereafter for newly created files at file creation. Attributes 402, generally initialized at file creation, include the owner, the creation time, and the initial size of the file. Other attributes 402 are calculated and updated as side effects of other operations. For example, a file's size attribute is normally recalculated when write operations add data to the file. According to a preferred embodiment of the present invention, the operating system 200 supplies initial attributes 402 to be stored when a directory file, i.e., a dnode 400, 406 or an fnode 401, is created.

Figure 5:
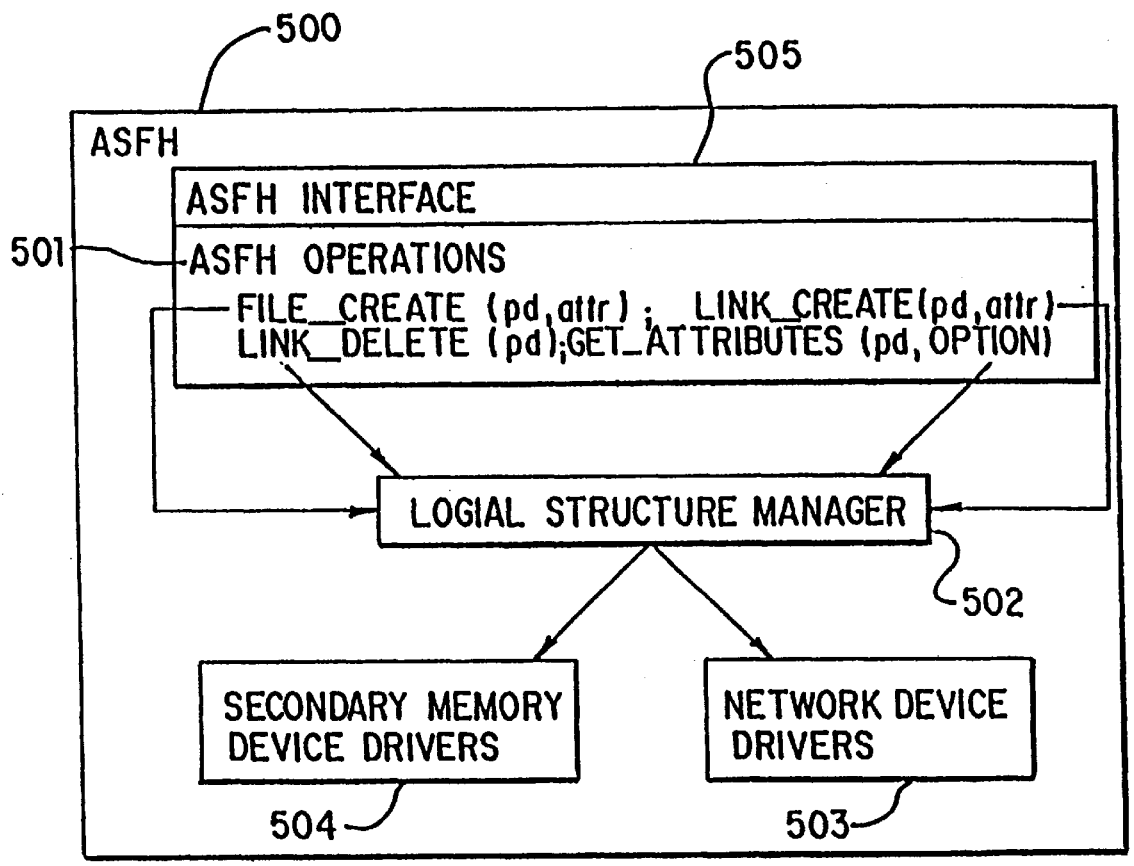
FIG. 5 shows a preferred structure of an Attribute Supplying File Hierarchy.

The present invention uses an Attribute Supplying File Hierarchy (ASFH) 500, shown in block diagram from in FIG. 5. Each ASFH 500 is associated with a file system and includes an interface for associating attributes with new files. The ASFH 500 supports a set of ASFH operations 501, and includes a logical structure manager 502, and a collection of secondary memory device drivers 504 or network drivers 503. A secondary memory device driver 208 is shown in FIG. 2. The logical structure manager 502 contains one or more dnode structures 400.

A user program invokes ASFH operations 501 (via an interface 505) to manipulate an ASFH 500. The logical structure manager 502 maintains the structure of a file graph, such as that shown in FIG. 4B. The logical structure manager 502 uses the secondary memory device drivers 504 or network device drivers 503 to store and retrieve data.

To enable the association of attributes 402 with files, an ASFH interface 505 provides access to operations 501 for associating attributes 402 with files. The operations 501 have a parameter for the attributes 402 (attr) to be associated and a path descriptor 1100 (pd) for identifying the particular files with which to associate the attributes 402. According to a preferred embodiment of the present invention, the operations 501 use these two parameters. The first parameter, pd, represents a path description 1100 which identifies the particular files to which the attributes 402 are associated. The second parameter, attr, represents the attributes 402 to be associated with the file or directory. Note that in the preferred embodiment of the present invention, ASFH operation link-delete( ) only accepts the pd parameter.

The details of parameter passing are well known. An alternative embodiment of the present invention uses a global system state, not shown. The global system state makes the parameters attr and pd available to the ASFH operations 501. No explicit parameter passing is required in a system employing a global system state.

Figure 11A:
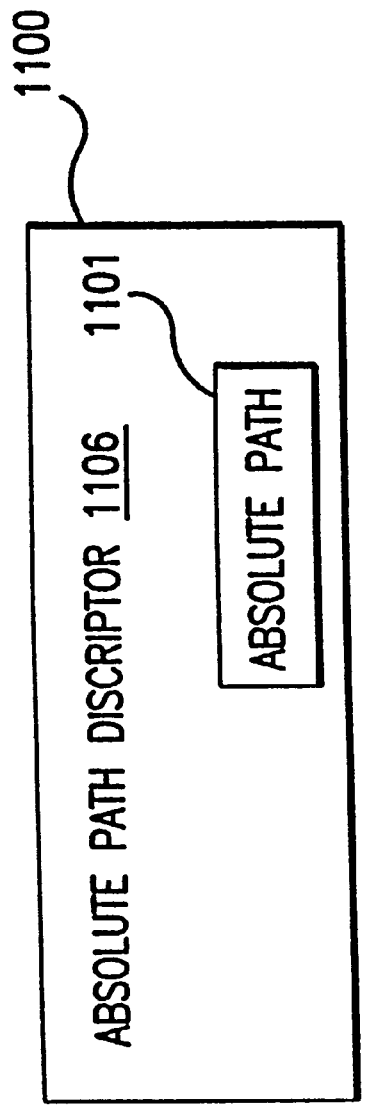
FIGS. 11A and 11B show preferred the structure of a path descriptor.
Figure 11B:
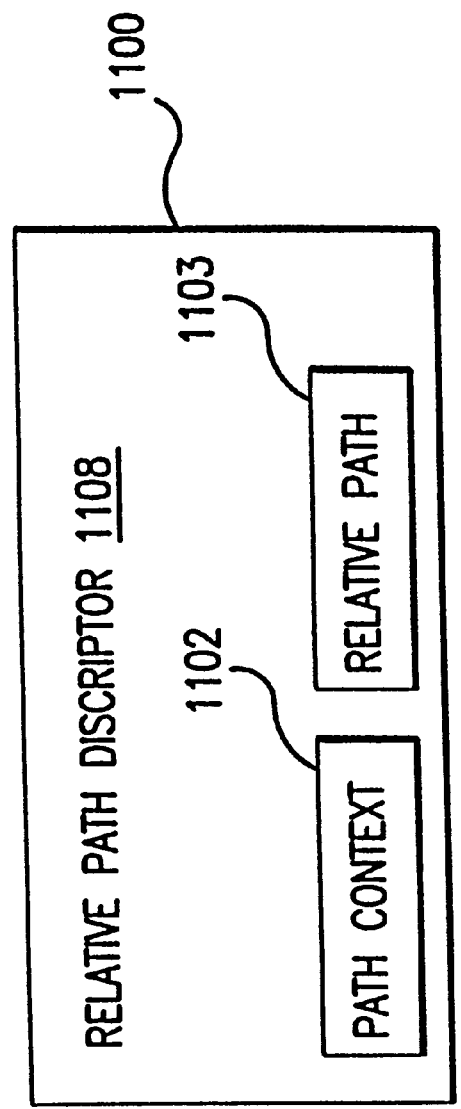

The parameters shown in FIG. 5 are path descriptor 1100 (pd), association option 702 (option), and attributes 402 (attr). As shown in FIGS. 11A and 11B, a path descriptor 1100 represents either an absolute path descriptor 1106 or a relative path descriptor 1108. FIG. 11A shows a absolute path descriptor 1106. An absolute path descriptor 1106 comprises an absolute path 1101. An absolute path 1101 is a path name starting with the "root" directory of a directory hierarchy. For example "/a/b/c" is an absolute path 1101 if the leftmost "/" represents the root directory, if "a" and "b" are directory names, if "c" is either a directory or a file name, and if successive "/" symbols separate each name in the path. To identify an existing file, an absolute path 1101 follows directory entry 301 structures from the root directory 406. An absolute path is a suitable path descriptor 1100 for identifying a file with which an attribute 402 is associated in an ASFH 500. Different operating systems and network services have different syntactic conventions for representing absolute path names. However, the use of absolute path references 1101 based on a single root directory 406 is well known in the art.

FIG. 11B shows a relative path descriptor 1108. A relative path descriptor 1108 comprises a path context 1102 and a relative path 1103. The path context 1102 and a relative path 1103 define the relative path descriptor 1108. A relative path 1103 is identical to an absolute path 1101 except that it need not start from the root directory 406. For example, "a/b/c" is a relative path. Without supplementary information, a relative path 1103 does not identify a file since a relative path 1103 does not specify where the start point of the path is. This information is provided by the path context 1102. An example of a path context is an absolute path 1101. For example, considering the relative path 1103 "b/c," the absolute path 1101 "/a" is a suitable path context 1102 because the combination, "/a/b/c" is an absolute path 1101 and is unambiguous. Alternative embodiments according to the present invention implement the path context 1102 as a pointer to a partially completed path name search, as a residue from previous path operations, or as low level information that locates a starting point for a relative path traversal.

According to an alternative preferred embodiment of the present invention, parameter pd represents a generic path descriptor 1100. Thus, pd, in the following discussion, may be an absolute path descriptor 1106 or a relative path descriptor 1108.

The ASFH 500 supports at least the following operations 501 (or their equivalents):

file_create(pd, attr)

The file_create( ) operation creates a new file described by the path descriptor 1100, "pd." In addition, it associates an attribute 402 "attr" with the new file. Both the path descriptor 1100 and the attribute 402 values may be provided explicitly as parameters to the file creation operation by an entity that requests that the ASFH create a file. An example of such an entity is a user process. In another preferred embodiment of the present invention, the parameters for the file_create( ) operation are provided by context information known to the system. Such context information may reside in a global system state.

According to a preferred embodiment of the present invention, a "reserved" attribute 402, e.g., "no val", indicates that the object does not have an associated attribute.

link_create(pd, attr)

The link_create( ) operation associates an additional unique path name with an existing file. Thus, a file may simultaneously be associated with many path names in the file system. The path name is represented by the path descriptor 1100, pd, parameter. In an alternative embodiment of the present invention, parameters are provided by a system context. The attribute parameter, attr, is optional in the link_create( ) operation. For systems where a file should have the same attribute value regardless of the path used to access them, all links to a file should associate the same attribute value with the file.

link_delete(pd)

The link_delete( ) operation removes a path name associated with a file. The path name is represented by the path descriptor 1100, pd. In an alternative embodiment of the present invention, parameters are provided by system context. An example of a system context is a global system state. When the last link to a file is deleted, the file itself is also deleted.

get_attribute(pd, attr)

The get attribute( ) operation retrieves the attribute 402, attr, associated with the file specified by path descriptor 1100, pd. In an alternative embodiment of the present invention, parameters are provided by system context. An example of a system context is a global system state. In yet another preferred embodiment of the present invention, get_attributes has three parameters: path descriptor 1100, pd, attribute association option 702, option, and attribute 402, attr. Invocation of get_attributes(pd, option, attr) retrieves the association option 702, option, and attribute 402, attr, associated with the file specified by path descriptor 1100, pd. In the case that there is more than one association option 702 and attribute 402 stored by the system for a single path descriptor 1100, get_attributes( ) returns all of the association options 702 in parameter option and all of the attributes 402 in parameter attr. The association options 702 and attributes 402 are returned to the caller of get_attributes( ) in such a manner that the caller can identify which association option 702 corresponds to which attributes 402.

In a preferred embodiment of the present invention, the ASFH 500 includes a move(pd1,pd2,attr) function. The purpose of move( ) is to move a file from one hardlink to another. In the preferred embodiment, the attributes 402 may be changed with the move. In an alternative preferred embodiment, move( ) is not permitted to modify the attributes 402. In the preferred embodiment, move( ) is implemented as a link_delete(pd1) followed by a link_create(pd2,attr). It would be apparent to a person skilled in the relevant art that other implementations are possible.

In a preferred embodiment of the present invention, the ASFH 500 includes a rename(pd1,pd2,attr) function. The purpose of the rename( ) function is to rename a file in the file system. In the preferred embodiment, the attributes 402 may be changed with rename( ). In an alternative preferred embodiment, rename( ) is not permitted to modify the attributes 402. In the preferred embodiment, rename( ) is implemented as a link_delete(pd1) followed by a link_create(pd2,attr). It would be apparent to a person skilled in the relevant art that other implementations are possible. For example, a DOS embodiment, because it must emulate a DOS copy function, would invoke file_create(pd2,attr), followed by link_delete(pd1).

In a preferred embodiment of the present invention, multiple ASFHs 500 are combined. An fnode 401 or dnode 400, 406 in a graph, of ASFH$_1$ is associated with the root file 406 of another ASFH, ASFH$_2$. The association merges the two hierarchies. The root file 406 of ASFH$_1$ becomes the root file of the merged ASFHs. This process is sometimes referred to as "mounting."

Integrating one or more ASFHs 500 into an operating system 200 is described with reference to FIG. 6. Each ASFH 500 resides within the supervisor state 205 of the operating system 200. It would be apparent to a person skilled in the relevant art to place ASFHs 500 in other parts of an operating system 200. For example, an ASFHs 500 might be placed in user state processes 202.

Figure 6:
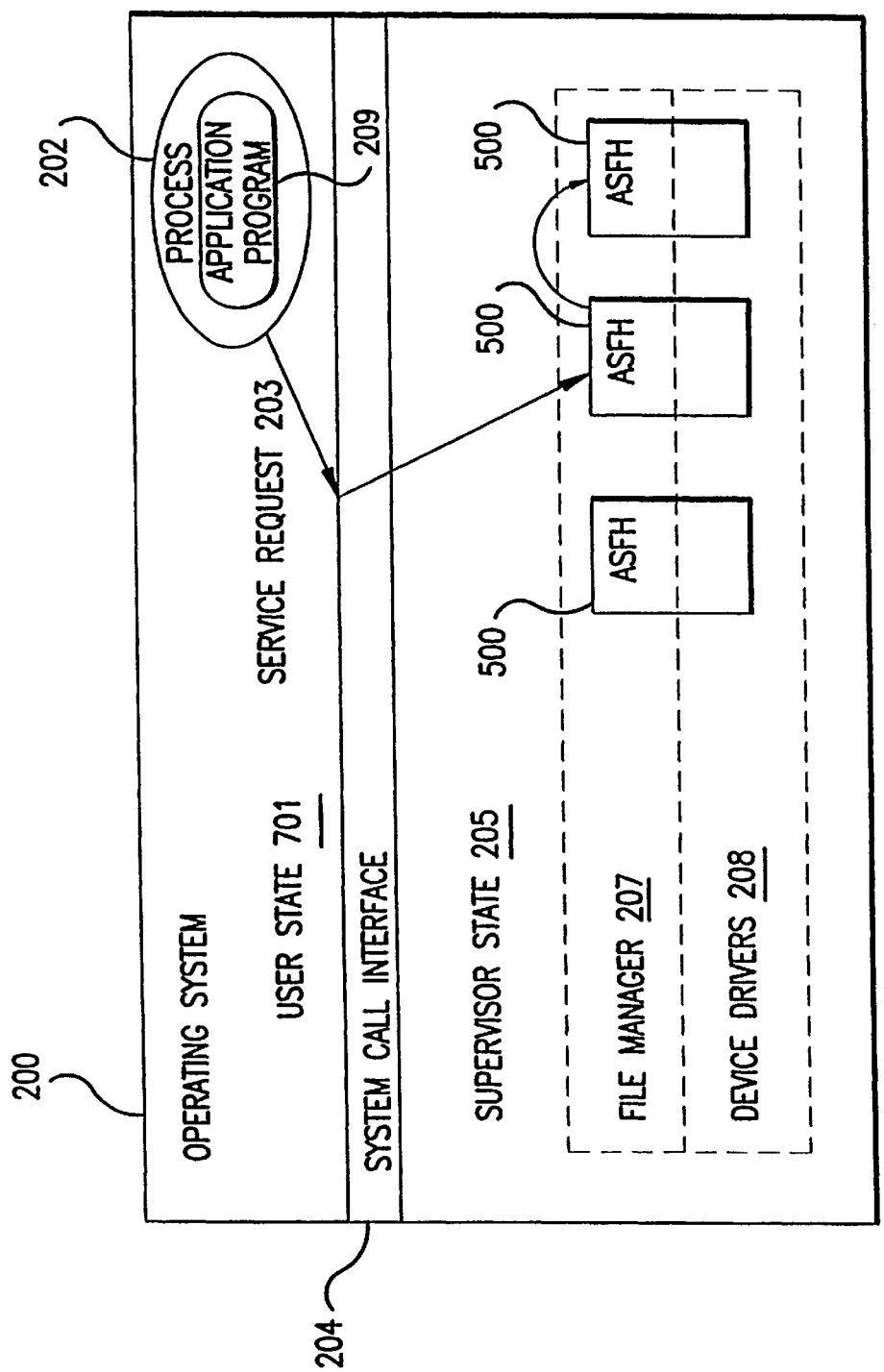
FIG. 6 shows how an ASFH is preferably used within an operating system.

As shown in FIG. 6, a service request 203 from a user state process 202 passes through a system call interface 204. The operating system 200 then calls one or more ASFH operations 501 before returning results to the user state process 202. Note that ASFH operations do not always return results to the user state process 202. If multiple ASFHs 500 have been combined, a single service request 203 may be forwarded to multiple ASFHs 500. This would occur, for example, where a path name spans the node at which the ASFHs 500 were combined. As an example of spanning, assume the root of an ASFH$_2$ is joined to the path "/a/b" for ASFH$_1$. An operation to access file "/a/b/c" would first search for "/a/b" on ASFH$_1$ and then search for "c" on ASFH$_2$.

Figure 7A:
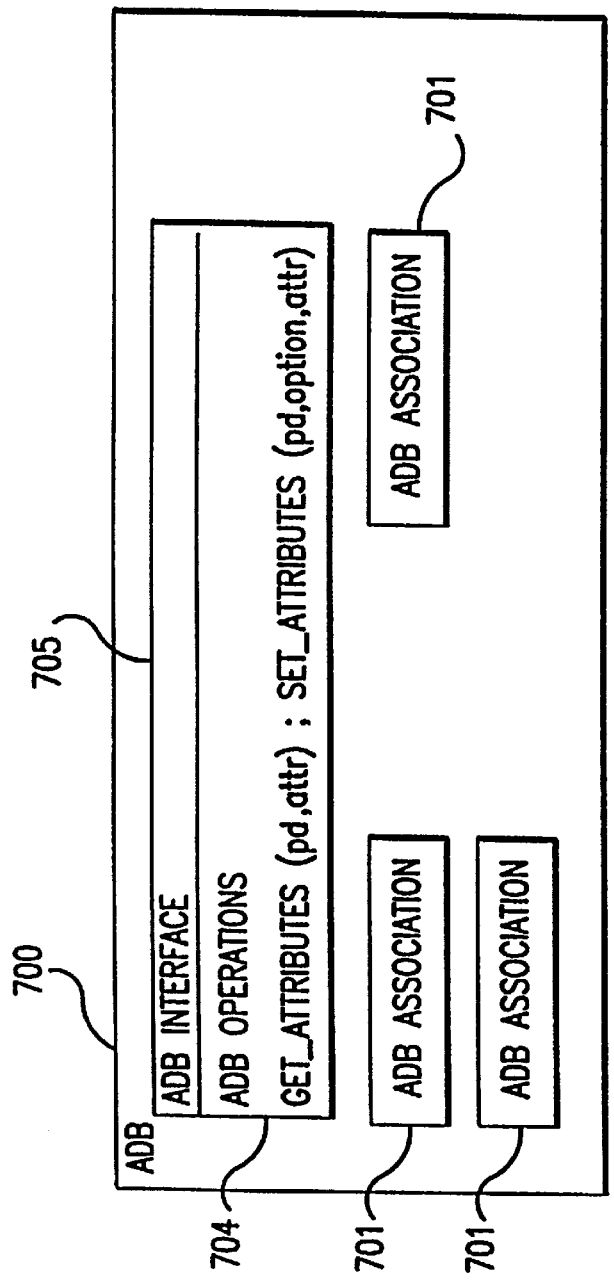
FIG. 7A shows the preferred structure of an Attribute Data Base (ADB).

According to the present invention, attributes are stored in an Attribute Data Base (ADB). An attribute association is the association of an attribute structure 402 with a path descriptor 1100. Referring to FIG. 7A, an ADB 700 is described. An ADB 700 comprises one or more attribute associations 701 to files, or sets of files, within an ASFH 500. An ADB 700 according to the preferred embodiment of the present invention supports two ADB operations 704, get_attributes( ) and set_attributes( ). Access to these operations is provided through interface 705). Get_attributes( ) retrieves the attributes 402 of an attribute association 701 in ADB 700. In another preferred embodiment of the present invention, get_attributes retrieves the association option 702, option, and attribute 402, attr, of an attribute association 701 in ADB 700. Set_attributes( ) adds a new attribute association 701 to the ADB 700.

In the preferred embodiment of the present invention, two parameters are passed to the function get_attributes( ). They are a path descriptor 1100, pd and a parameter to receive attributes 402, attr. The attributes are returned in attr. Similarly, in the preferred embodiment of the present invention, set_attributes( ) is implemented as a function having three parameters, pd, option, and attr. The parameter "pd" is a path descriptor 1100. The parameter "option" is an association option 702. The parameter "attr" is an attribute 402. In another preferred embodiment of the present invention, get_attributes( ) is a function having three parameters: path descriptor 1100, pd, attribute association option 702, option, and attribute 402, attr. Invocation of get attributes(pd, option, attr) retrieves the association option 702, option, and attribute 402, attr, associated with the file specified by path descriptor 1100, pd. In the case that there is more than one association option 702 and attribute 402 stored by the system for a single path descriptor 1100, get_attributes( ) returns all of the association options 702 in parameter option and all of the attributes 402 in parameter attr. The association options 702 and attributes 402 are returned to the caller of get_attributes( ) in such a manner that the caller can identify which association option 702 corresponds to which attributes 402.

The preceding embodiments represent only a few of the ways in which set_attributes( ) and get_attributes( ) might be implemented. It should be noted that many implementations are possible without deviating from the scope and spirit of the present invention. It would be apparent to a person skilled in the relevant art that get_attributes( ) and set_attributes( ) are implementable in a variety of ways.

In an alternative embodiment of the present invention, the ADB 700 supports a delete_association(pd,option) operation. The delete_association operation deletes an association having a path descriptor 1100 matching pd and an association option 702 matching option.

The ADB 700 represents arbitrary associations between attributes 402 and files 300, 403 in an ASFH 500. According to the preferred embodiment of the present invention, attributes 402 need not be stored one-to-one with files 300, 403. Thus, given a set S of attributes and a set F of files, an ADB 700 can associate any element of S with any element of F. The association is performed regardless of the size of F or the size of S. Furthermore, an ADB can associate a different element of S with any subset of F or all the elements of F.

Figure 7B:
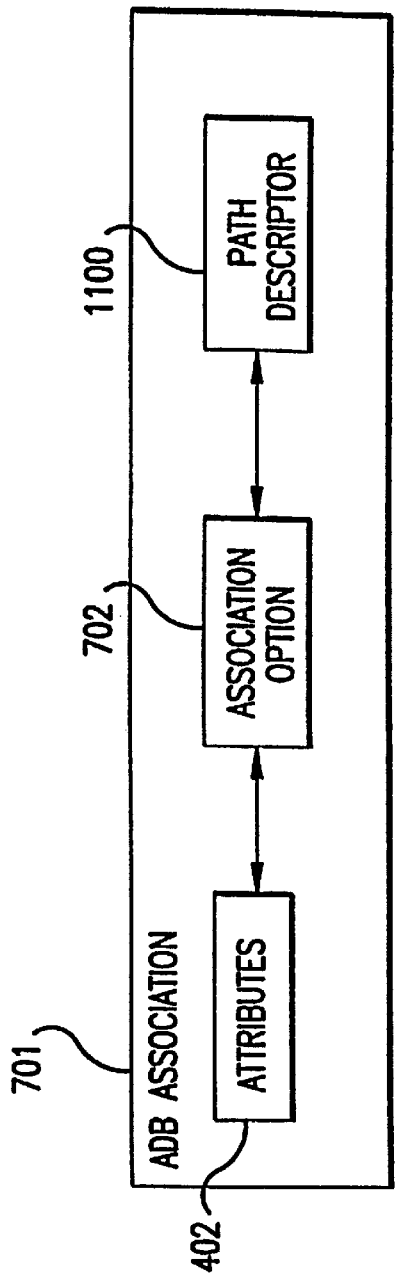
FIG. 7B shows the preferred structure of an ADB association.

FIG. 7B shows the general structure of an ADB association 701. An ADB association 701 contains an attributes object 402, an association option 702, and a path descriptor 1100. According to a preferred embodiment of the present invention, the association option 702 can assume the values "implicit" or "explicit." If the association option 702 value is "explicit," the attributes 402 are associated exactly with the file 300,403 identified by the path descriptor 1100 object. In the absence of other, possibly overriding, associations, if the association option 702 value is implicit the attributes 402 are associated with the path indicated by the path descriptor 1100 and with all paths having that path as a prefix. An overriding association is either explicit association having a path descriptor 1100 that identifies a file or another implicit association having a path descriptor 1100 describing a longer prefix of the path descriptor 1100 identifying the file. A prefix is defined as follows: A path A is a prefix of path B if path B contains all of path A as its beginning part. For example, the path "/a/b/c" is a "prefix" of path "/a/b/c/d" because the second path contains all of the first path as its beginning part. Every path is a prefix of itself.

An explicit association exists one-to-one with the object it describes. An implicit association associates attributes with many paths that are not explicitly listed. When implicit associations are used, it is possible to have attribute association conflicts where two or more ADB associations 701 associate different attributes 402 with the same path. Thus, according to a preferred embodiment of the present invention, the ADB 700 includes rules to resolve such association conflicts.

Figure 8:
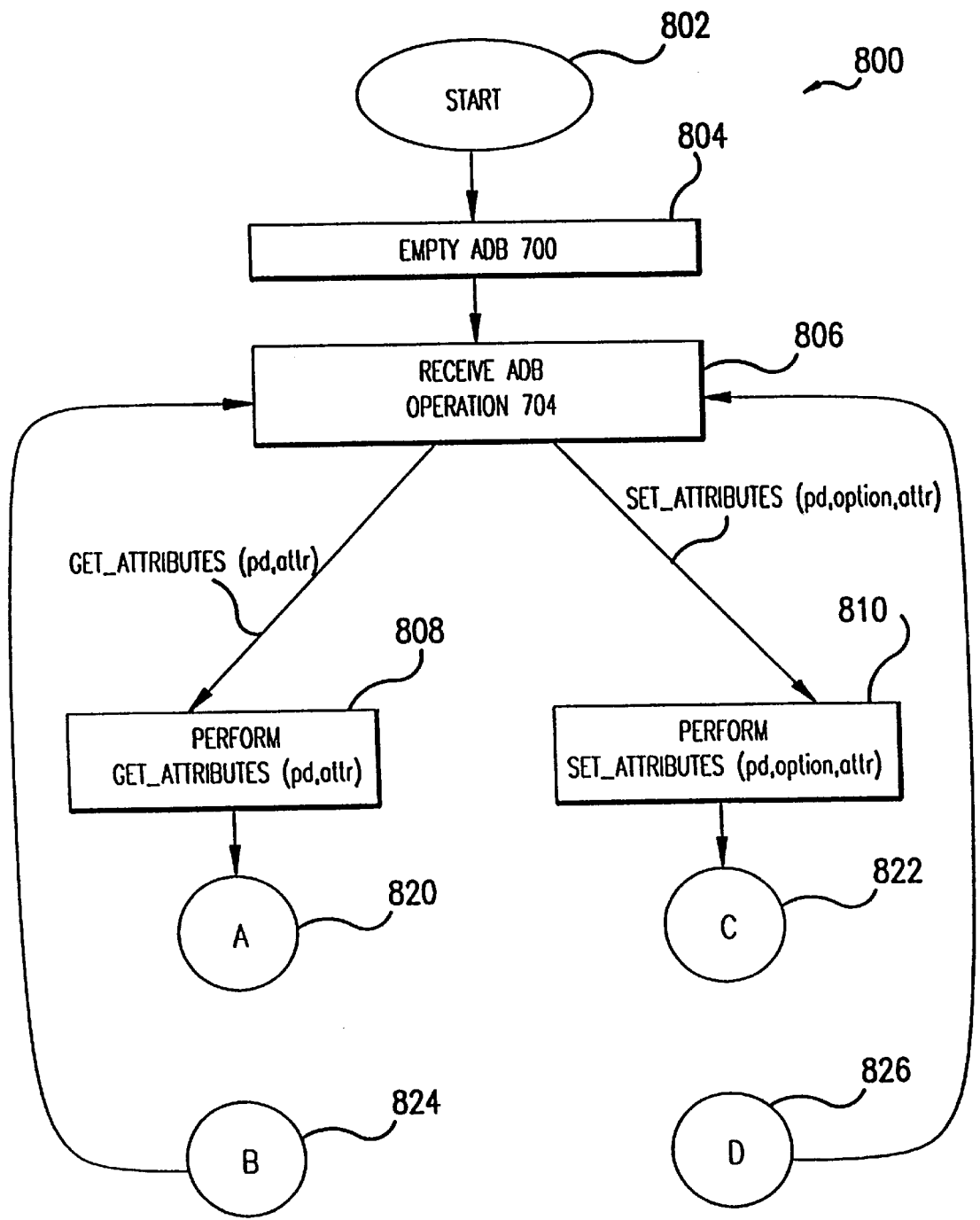
FIGS. 8, 9, and 10 are flowcharts depicting the preferred operation of an ADB.
Figure 9:
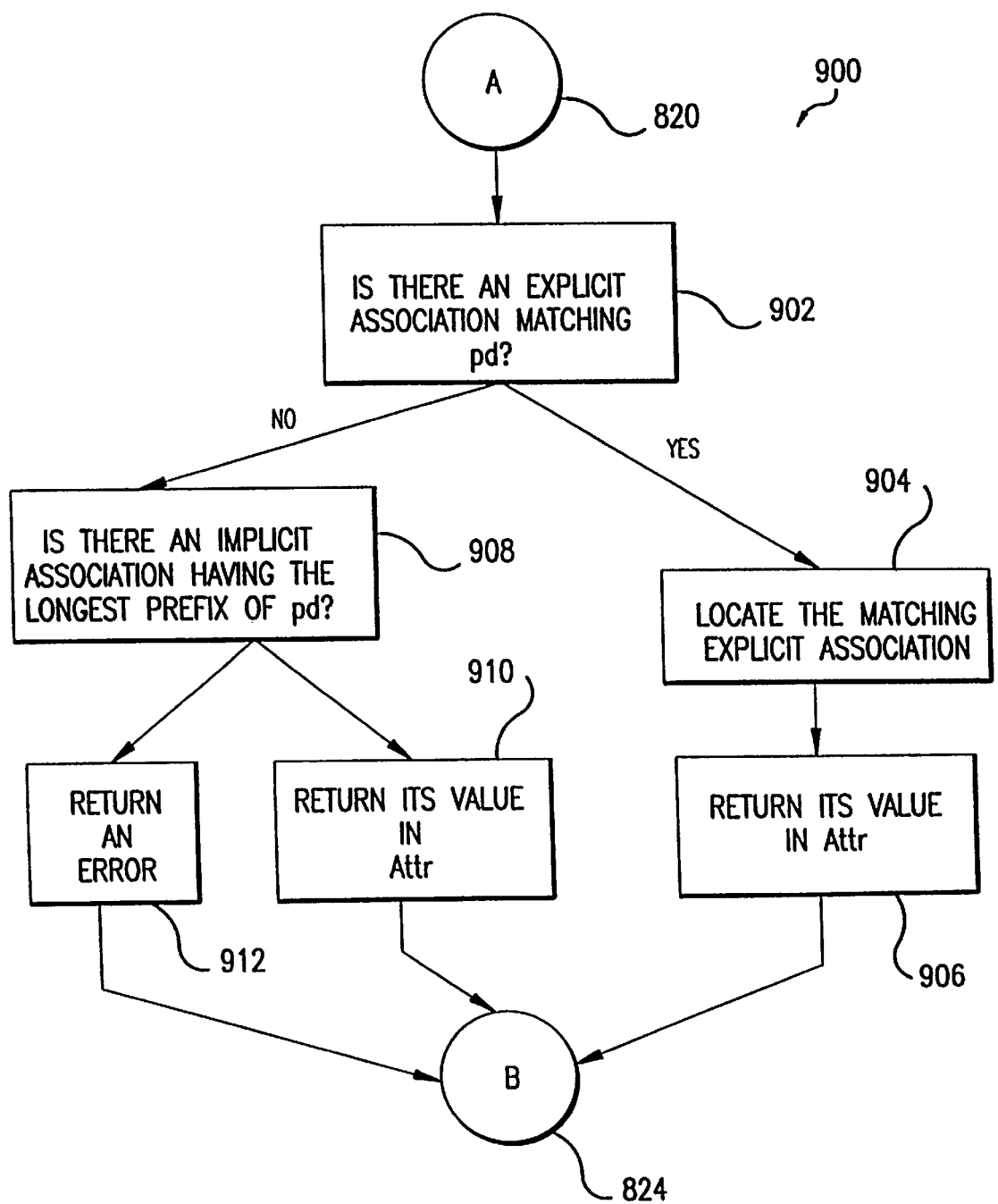
Figure 10:
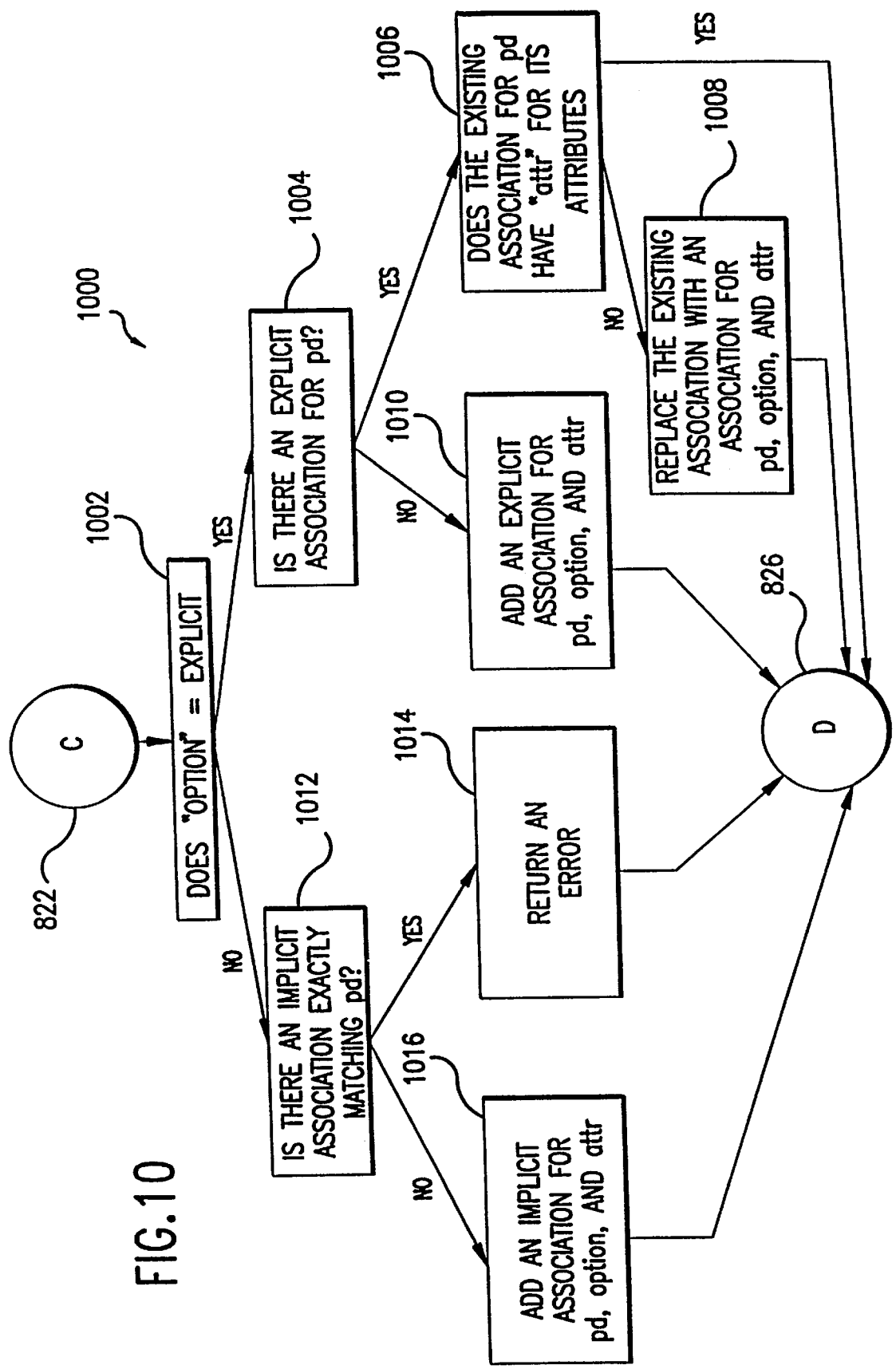

With reference to FIGS. 8–10, the operation of ADB 700 is described. ADB 700 processing begins in step 802 on flowchart 800. In step 802, control immediately passes to step 804. Step 804 sets ADB 700 to an empty state. In one embodiment of the present invention, ADB 700 is initialized (not shown) by reading the contents of a distinct ADB initialization file (not shown) when computer system 100 is initialized. In an alternative embodiment, ADB 700 is initialized (not shown) by one or more calls to set_attributes( ) to set the initial state of ADB 700. Control transitions to step 806 which begins a main control loop. The main loop comprises steps 806, 808, 810, 820, 822, 824, and 826. The ADB 700 waits in step 806 until it receives a request for an ADB operation 704. Upon receiving a request for an ADB operation 704, the ADB 700 determines whether its received request was for a get_attributes( ) operation or a set_attributes( ) operation. ASFH 500 accesses ADB 700 via ADB interface 705.

If ADB 700 determined that it received a get_attribute( ) operation then control transfers to step 808 where the ADB 700 performs the get_attributes( ) operation. In a preferred embodiment of the present invention, get_attributes( ) passes two parameters. The first is a path descriptor 1100, pd, indicating where the desired attributes are located. The second parameter is an attribute structure 402, attr, in which the attribute value or values will be returned. The get_attributes(pd, attr) operation is described in more detail in flowchart 900 in FIG. 9. Thus, from step 808, the ADB 700 transfers control through step 820 to step 902 of flowchart 900. In step 902, the ADB 700 determines whether the ADB 700 contains an explicit association matching path descriptor parameter pd.

If ADB 700 finds such a path descriptor pd, it locates the matching explicit association in step 904. The ADB 700 in step 906 returns the attribute value associated with the matching explicit association in parameter attr. Control then passes through step 824 to the main loop, step 806, in flowchart 800.

If the ADB 700 in step 902 determines that it does not contain a matching explicit association, it searches, in the ADB 700, for the implicit association having as its path descriptor the longest prefix of path descriptor pd as shown in step 908. If it finds no such implicit association, then the ADB 700 concludes that it does not contain an attribute association that satisfies the received ADB request. Thus, ADB 700 returns an error in step 912 and returns to the main loop, step 806 in flowchart 800, through step 824. If, the ADB search in step 908 reveals the presence of an implicit association having as its longest path descriptor 1100 the longest prefix of path descriptor pd, ADB 700 proceeds to stop 910. In step 910, ADB 700 returns, in parameter attr, the value of the attribute associated with the implicit association found in step 908. In an alternative preferred embodiment (not shown) of the present invention, get_attributes( ) has a third parameter, option. In the alternative preferred embodiment, attribute association option 702 corresponding to returned attribute 402 is returned in parameter option in addition to returning attribute 402 in parameter attr. Control then passes through step 824 to the main loop, step 806 in flowchart 800.

Referring to FIG. 8, if ADB 700 in step 806 determined that it received a set_attributes( ) operation then control transfers to step 810 where the ADB 700 performs the set_attributes( ) operation. In a preferred embodiment of the present invention, set_attributes( ) passes three parameters. The first is a path descriptor 1100. The second is an attribute association option 702. The third is one or more attributes 402. The set_operation(pd, option, attr) is described in more detail in flowchart 1000 in FIG. 10. Thus, from step 810, the ADB 700 transfers control through step 822 to step 1002 of flowchart 1000. In step 1002, the ADB 700 determines whether the association option parameter of the received request is explicit or implicit.

If ADB 700 in step 1002 determines that the association option is explicit, control transfers to step 1004. In step 1004, ADB 700 determines whether it contains an explicit association matching path descriptor pd. If ADB 700 in step 1004 determines that there is no such explicit association in ADB 700, one is added as shown in step 1010. Processing then returns, through step 826, to the main loop, step 806 in flowchart 800. If ADB 700 determines that it contains an explicit association exactly matching path descriptor pd, it determines whether the attributes existing for the matching path descriptor exactly match those in attribute parameter attr. ADB 700 makes this determination in step 1006. If the attributes do not match, then ADB 700 proceeds to step 1008 in which it replaces the existing association with an association in accordance with the parameters passed by the set_attributes(pd, option, attr) operation. Processing then returns, through step 826 to the main loop 806 in flowchart 800. If the attributes match in step 1006, the replacement step 1008 is bypassed because there is no need to replace the attributes. ADB 700 then returns, through step 826, to the main loop 806 in flowchart 800. It is noted that it would apparent to one ordinarily skilled in the art that the replacement step could be used all the time. That is, a system using the present invention could always replace the attributes as shown in step 1008, thereby forgoing the attribute equivalence check in step 1006. However, this may not be efficient in cases where the attributes are very complex, in which case a simple check may be more efficient than blindly replacing the attributes.

If, in step 1002, ADB 700 determines that the value of the passed association option parameter, option, is implicit, it proceeds to step 1012. In step 1012, ADB 700 determines whether there is an implicit association exactly matching path descriptor pd. If there is, then ADB 700 returns an error in step 1014. Thus, ADB 700 does not allow a pre-existing implicit association to be overridden. In an alternative embodiment of the present invention (not shown), the ADB 700, in step 1014, replaces the matching implicit association with an implicit association according to attr, option, and pd. Thus, in the alternative embodiment, the ADB can override an existing implicit association. In using the alternative embodiment, care must be exercised to avoid overriding a desired attribute hierarchy. The simplified representation afforded by the present invention will enable an operator to readily determine where the undesirable overriding will occur. Control then passes through step 826 to the main loop, step 806, in flowchart 800.

If, in step 1012, ADB 700 determines that it does not contain an implicit association exactly matching pd, then in step 1016 it adds an implicit association in accordance with parameters, pd, option, and attr. Control then passes through step 826 to the main loop, step 806, in flowchart 800.

In an alternative preferred embodiment (not shown) of the present invention, set_attributes( ) searches, in the ADB 700, for the implicit association having as its path descriptor the longest prefix of path descriptor pd. If there is such an association and its attribute 402 matches parameter attr, attribute 402, set_attributes( ) merely returns to the program which invoked it.

Figure 14:
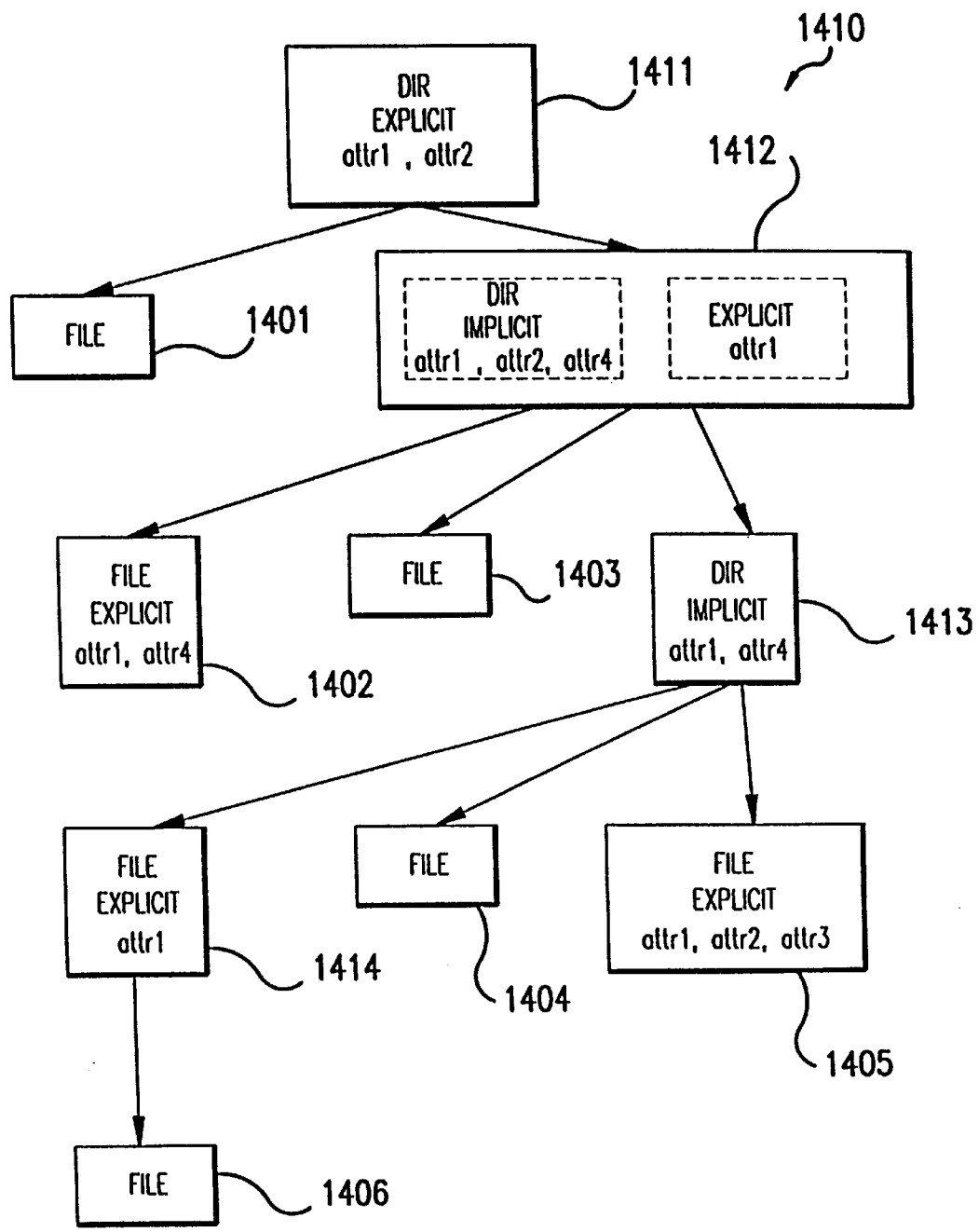
FIG. 14 illustrates an example file hierarchy and associated attributes.

An example of the operation of the flowcharts 900 and 1000 is given in FIG. 14. FIG. 14 represents an example of a hierarchically organized file system 1400. In the illustrated file system, there are 6 files, 1401, 1402, 1403, 1404, 1405, and 1406. In addition there are 4 directories, 1411, 1412, 1413, and 1414. As previously explained, each directory is a kind of file. Assume further, that there are 4 attributes attr1, attr2, attr3, and attr4. Using set_attributes(attr, option, pd), the attributes can be assigned to the files and directories in an arbitrary manner. Note the attributes can be assigned one or more at a time. An example is illustrated in FIG. 14 where the attributes attr1, attr2, attr3, and attr4 have been associated in an arbitrary manner with the files or directories, more specifically with a path descriptor to each file or directory. For example, directory 1411, has attr1 and attr2 associated with it. In addition to attribute associations, the association option, implicit or explicit, has been designated. Thus, to set the attributes for directory 1411, the following set_attributes command would be used: set_attributes("/1411", "explicit",attrs), where attrs is a structure comprising attributes attr1 and attr2. FIG. 15 illustrates the status of the ADB 700 after the operation of set_attributes(attr, option, pd) for this example.

The get_attributes(pd, attr) is described with reference to FIGS. 9, 14 and 15. By the logic of flowchart 900, get_attributes("/1411", attrs) returns attributes attr1 and attr2 in parameter attrs. Get_attributes("/1411/1412/1413/1404", attrs) returns attributes attr1 and attr3 in parameter attrs. This is because get_attributes(pd, attr) returns the attributes corresponding to the implicit association whose as its path descriptor has the longest prefix of "/1411/1412/1413/1404". Similarly, get_attributes("/1411/1412/1413", attrs) returns attributes attr1 and attr3 in attrs. This is because the implicit association having as its path descriptor the longest prefix of "/1411/1412/1413" has a path descriptor "/1411/1412/1413". This illustrates that every path descriptor is a prefix of itself. Get_attributes("/1411/1401", attrs) returns an error because there is no longest prefix of "/1411/1401" which is implicit. Get_attributes("/1411/1412/1413/1414", attrs) returns attribute attr1 in parameter attrs. This demonstrates that get_attributes(pd, attr) treats an ADB association 701 having an explicit association option 702 as having priority over an ADB association 701 having an implicit association option 702. In a similar manner, get_attributes ("/1411/1412/1402", attrs) returns attributes attr1 and attr4 in parameter attrs. Get_attributes("/1411/1412/1413/1414/1406", attrs) returns attributes attr1 and attr3 in parameter attrs. This is because the implicit association having the longest prefix of "/1411/1412/1413/1414/1406", attrs) is "/1411/1412/1413." Get_attributes("1411/1412", attrs) returns attr1 because, for a particular path descriptor, an attribute association 704 having an association option 702 having a value of explicit takes precedence over an attribute association having an association option 702 having a value of implicit. Get_attributes("/1411/1412/1403", attrs), however, returns attributes attr1, attr2, and attr4 in parameter attrs.

It would be apparent to a person skilled in the relevant art that many alternative embodiments of the present invention are possible. For example, in one alternative embodiment, a system might require that unique path name descriptors be passed to an ADB 700 in a set_attribute(pd, option, attr) operation. Another alternative embodiment provides "garbage collection" that would also remove associations that no longer have an effect. These and other variations fall within the scope and spirit of the present invention.

FIG. 12 shows the structure of the HASS 1200. The HASS 1200 has HASS Operations 1201 (access to which are provided via an interface 1220) that are similar to those included in the ASFH Operations 501, an ADB 700, one or more ASFH 500 subsystems, and an attribute controller 1202. The HASS 1200 connects the ASFH 500 subsystems to the ADB 700 so that the ADB 700 satisfies the attribute retrieval and storage needs of the ASFH 500 subsystems. The attribute controller 1202 connects ASFH operations 501 with ADB operations 704 so that ASFH 500 operations that require an attributes object 402 to be stored are satisfied by the ADB operation set_attributes( ). Operations that require retrieval of an attributes object 402 are satisfied by the ADB operation get_attributes( ). In an alternative embodiment of the present invention, the attribute controller 1202 is distributed among the ASFH 500 subsystems.

In FIG. 13, flowchart 1300 illustrates the HASS method of operation. The method begins in step 1301 where control transfers immediately to initialization step 1302. In step 1302, the HASS method initializes the ADB 700 with attribute associations 701. The ADB 700 is loaded with an initial set of attribute associations 701, having association options 702 which have a value of explicit or implicit. These associations give an initial attribute value to every file stored in an ASFH 500. According to a preferred embodiment of the present invention, a reserved value "no-val" indicates that there is no initial value associated with the attribute.

The method then transitions to step 1304 where a main loop is initiated in which the HASS method waits for a HASS operation request 1201. When the method receives a HASS operation request in step 1304 control transfers to step 1306, step 1312, step 1318, or step 1321 according to the received operation request.

If the received operation request is a file_create(pd, attr) operation then the system creates a new dnode 400 or fnode 401 in step 1306. Thus, the method must associate attributes 402 with the created directory 300 or file 403. The method in step 1308 calls the ADB set_attribute( ) operation, described above, with parameters pd, option, and attr. After creating a new ADB association 701, the method transfers to step 1310. In step 1310, the ASFH operation file_create( ) is called with parameters pd and attr resulting in the creation of a new directory 300 or file 403 and associated attributes 402. The method then transfers control to step 1302 where the method is repeated.

If the received operation request is a link_create(pd, attr) operation, then the system creates a link in step 1312. The process is analogous to the process described above for file creation. Thus, in step 1314, the method calls the ADB set_attributes( ) operation with parameters pd and attr. After creating a new ADB association 701 corresponding to the link, the method physically creates the link by calling, in step 1316, the ASFH 500 operation link create( ) with parameters pd and attr. Control then returns to step 1304 where the method awaits a subsequent HASS operation request.

If the received operation request is a link_delete( ) operation, the system removes a file in step 1318. Control transfers to step 1320 where the actual link is deleted from the file system. This is accomplished by calling the ASFH 500 operation link_delete( ) with the parameter pd. As described above, when the last link to a file is deleted, the file is also deleted. Control then returns to step 1304 where the method awaits a subsequent HASS operation request.

If the received operation request is a get_attributes( ) operation, the system retrieves attributes 402 from the corresponding link or file. The system transfers to step 1321, where it invokes the ADB operation get_attributes( ). In step 1322, the system retrieves attributes 402 from the ADB 700 according to the parameters passed in the ADB 700 get_attributes( ) call. In an alternative preferred embodiment (not shown), the system retrieves attributes 402 by calling ASFH operation 501 get_attributes( ). In the alternative preferred embodiment, get_attributes( ) satisfies the received operation request by calling ADB operation 704 get_attributes(pd,attr). In step 1323, the system physically transfers the retrieved attributes 402 to the operating system in the parameter attr. According to an alternative preferred embodiment (not shown) of the present invention, get_attributes( ) retrieves association option 702 in addition to attribute 402. According to yet another preferred embodiment of the present invention, get_attributes( ) retrieves attributes 402 from a system context, such as a global system state, without explicit parameter passing. Control then returns to step 1304 where the method awaits a subsequent HASS operation request.

According to a preferred embodiment of the present invention, every path associated with a file in an ASFH 500 must resolve to the same attributes in the ADB 700. This property can be achieved by scanning the HASS 1200 prior to its initial use and adding supplementary associations to resolve ambiguities. Scanning is required where the ASFH is not initially empty because there is no way to tell initially if there are multiple hardlinks to one object. Alternatively, if the ASFH is empty, no scanning is required.

Continuing the example of FIGS. 14 and 15, the hierarchical structure shown in FIG. 14 would be set up using the HASS file_create(pd, attr) operation which invokes the ASFH file_create(pd, attr) operation. The attributes to be associated with a particular path descriptor 1100 are passed to the ADB 700 via the ASFH 500 using the attr parameter of a file_create(pd,attr) function. To associate multiple hardlinks with a particular file, the HASS link_create(pd, attr) operator invokes the ASFH link_create(pd,attr) operator. Note that no attr need be passed. That is, if attr is null, the link will just associate a name with a path descriptor. Attributes existing at that path descriptor remain unchanged. When the file or link is created, the ASFH invokes the necessary ADB operations.

An alterative preferred embodiment of the present invention includes "static" as a third attribute association option 702. In the alternative preferred embodiment, static is used to prevent modification of attribute associations (that have been assigned the value of static) after the ADB is initialized, in step 1302, with associations of attributes 402, association options 702, and path descriptors 1100. In the alternative preferred embodiment, static serves to further describe the explicit or implicit attribute association option 702. Implementation of static in the alternative preferred embodiment affects steps 1008, 1010, and 1016 in FIG. 10. Steps 1008 and 1016 would include a step (not shown) to determine whether the attribute association option 702 is static. If it is, set_attributes( ) exits, through step 826 to the main loop, step 806. Step 1010 would include a step to determine if there is an association option 702 having a longest prefix of path descriptor 1100 pd which had a value of implicit and also a value of static. If there is such an association option 702, step 1010 exits through step 826 to the main loop, step 806.

In one embodiment, the invention is a computer program product (also called a program storage device) having a computer readable medium. Control logic (such as software) is stored in the computer readable medium. The control logic, when executed by a processor, causes the processor to perform the operations discussed herein.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for interacting with a computer's operating system to superimpose attributes on the computer's hierarchically organized file system, comprising the steps of:

(1) interacting with an application program running on the computer to receive one of a plurality of hierarchically attribute superimposition subsystem (HASS) operations, wherein said one of the plurality of HASS operations specifies a file node or a directory node within the hierarchically organized file system;

(2) invoking one of a plurality of attribute database (ADB) operations, wherein said one of the plurality of ADB operations references attribute association information for said file node or said directory node; and (3) invoking one of a plurality of attribute supplying file hierarchy (ASFH) operations, wherein said one of the plurality of ASFH operations physically interacts with the computer's operating or hierarchically organized file system to accomplish said one of the plurality of HASS operations;

wherein said steps (1) to (3) allow attributes to be arbitrarily associated with said file node or said directory node.

2. The method of claim 1, wherein step (1) comprises the step of:

receiving one of the following of said plurality of HASS operations:
  (i) file_create( );
  (ii) link_create( );
  (iii) link_delete( ); and
  (iv) get_attributes( ).

3. The method of claim 1, wherein step (2) comprises the step of:

receiving one of the following of said plurality of ADB operations:
  (i) get_attributes( );
  (ii) set_attributes( ); and
  (iii) delete_association( ).

4. The method of claim 1, wherein step (3) comprises the step of:

receiving one of the following of said plurality of ASFH operations:
  (i) file_create( );
  (ii) link_create( );
  (iii) link_delete( );
  (iv) get_attributes( );
  (v) move( ); and
  (vi) rename( ).

5. A system for superimposing attributes on the computer's hierarchically organized file system hierarchically attribute superimposition subsystem method comprising:

an ADB;

an ASFH;

a HASS, wherein said HASS comprises:
  receiving means for receiving a HASS operation request containing one or more parameters;
  determining means for determining if said received HASS operation request is one of the following:
    (i) file_create( );
    (ii) link_create( );
    (iii) link_delete( ); and
    (iv) get_attributes( ); and
  responding means, responsive to said determining means, for responding to said received HASS operation request, wherein said responding means comprises:
    first creating means for creating a file specified by said parameters in said ASFH and updates said ADB if said received HASS operation request is said file_create( ) operation;

second creating means for creating a link in said ASFH and updates the ADB if said received HASS operation request is said link_create( ) operation;

deleting means for deleting the link from said ASFH if said received HASS operation request is said link_delete( ) operation; and retrieving means for retrieving attributes, specified by said parameters, from said ADB if said received HASS operation is said get_attributes( ) operation.

6. A computer program product comprising a computer usable medium having computer readable program code means embodied in said medium for causing an application program to execute on a computer that provides a system for managing a plurality of files each of which is capable of being referenced by a plurality of hardlinks, said computer readable program code means comprising:

a first computer readable program code means for causing the computer to maintain a database having stored therein a plurality of attribute association entries each having a path descriptor, an attribute, and an association option having a value of implicit;

a second computer readable program code means for causing the computer to receive a database operation request specifying a path descriptor referencing a file;

a third computer readable program code means for causing the computer to determine if there is an entry in said database having an association option having a value of implicit, and also having a path descriptor matching a longest prefix of said path descriptor referencing said file; and a fourth computer readable program code means for causing the computer to return an attribute of said entry if said path descriptor of said entry matches said longest prefix of said path descriptor referencing said file, and also if said entry has an association option having a value of implicit.

7. The computer program product of claim 6, further comprising:

a fifth computer readable program code means for causing the computer to initialize said database with an initialization entry having a initial path descriptor, an initial attribute, and an initial association option having a value of one of explicit and implicit.

8. The computer program product of claim 6, further comprising:

a fifth computer readable program code means for causing the computer to detect instances where a particular file of said plurality of files has a different attribute or attributes corresponding to a plurality of hardlinks referencing said particular file; and a sixth computer readable program code means for causing the computer to report said instances in response to a user request.

9. The computer program product of claim 6, further comprising:

a fifth computer readable program code means for causing the computer to return an error if no entry in said database has a path descriptor matching said longest prefix of said path descriptor referencing said file.

10. A computer program product comprising a computer usable medium having computer readable program code means embodied in said medium for causing an application program to execute on a computer that provides a system for managing a plurality of files each of which is capable of being referenced by a plurality of hardlinks, said computer readable program code means comprising:

a first computer readable program code means for causing the computer to maintain a database having stored therein a plurality of entries each having a path descriptor, an attribute, and an association option having a value of implicit;

a second computer readable program code means for causing the computer to receive a database operation request specifying a path descriptor referencing a file, an attribute to be attributed to said file, and an association option for said attribute to be attributed to said file;

a third computer readable program code means for causing the computer to determine if there is an entry in said database having an association option having a value of implicit, and also having a path descriptor matching said path descriptor referencing said file; and a fourth computer readable program code means for causing the computer to add into said database an attribute association entry having a path descriptor equal to said path descriptor referencing said file, an attribute equal to said attribute to be attributed to said file, and an association option equal to said association option for said attribute to be attributed to said file if there is no entry in said database having an association option having a value of implicit, and having a path descriptor matching said path descriptor referencing said file.

11. The computer program product of claim 10, further comprising:

a fifth computer readable program code means for causing the computer to determine whether said association option for said attribute to be attributed to said file has a value of implicit or explicit;

a sixth computer readable program code means for causing the computer to determine if there is an entry in said database having a path descriptor matching said path descriptor referencing said file, and also having an association option having a value of explicit;

a seventh computer readable program code means for causing the computer to add an attribute association entry having a path descriptor equal to said path descriptor referencing said file, an attribute equal to said attribute to be attributed to said file, and an association option equal to said association option for said attributes to be attributed to said file if there is no entry in said database having a path descriptor exactly matching said path descriptor referencing said file, and having an association option equal to explicit; and an eighth computer readable program code means for causing the computer to replace an attribute association entry, determined by said sixth computer readable program code means to have a path descriptor matching said path descriptor referencing said file and to have an association option having a value of explicit, with an attribute association entry having a path descriptor equal to said path descriptor referencing said file, an attribute equal to said attribute to be attributed to said file, and an association option for said attribute to be attributed to said file.

wherein said third computer readable program code means is performed only if it is determined by said fifth computer readable program code means that said association option for said attribute to be attributed to said file has a value of implicit, and wherein said sixth computer readable program code means is performed only if it is determined by said fifth computer readable program code means that said association option for said attribute to be attributed to said file has a value of explicit.

12. The computer program product of claim 11, wherein said eighth computer readable program code means is performed only if an attribute association entry is determined by said sixth computer readable program code means to have a path descriptor matching said path descriptor referencing said file, and an association option having a value of explicit, and said attribute association entry does not have an attribute that matches said attribute to be attributed to said file.

13. The computer program product of claim 10, further comprising:

a fifth computer readable program code means for causing the computer to return an error if there is no entry having a path descriptor exactly matching said path descriptor referencing said file, and having an association option equal to implicit.

14. The computer program product of claim 10, further comprising:

a fifth computer readable program code means for causing the computer to determine if there is an entry having a path descriptor matching a longest prefix of said path descriptor referencing said file, and having an attribute that matches said attribute to be attributed to said file;

wherein said third computer readable program code means is performed only if there is no entry determined in said fifth computer readable program code means to have a path descriptor matching said longest path descriptor of said path descriptor referencing said file, and to have an attribute that matches said attribute to be attributed to said file.

15. The computer program product of claim 11, further comprising:

a ninth computer readable program code means for causing the computer to initialize said database with an initialization entry having a initial path descriptor, an initial attribute, and an initial association option having a value of one of explicit, implicit, static implicit, and static explicit.

16. The computer program product of claim 11, wherein said fourth computer readable program code means, said seventh computer readable program code means, and said eighth computer readable program code are performed only if said entry having a path descriptor matching said path descriptor matching referencing said file does not have an attribute association equal to static explicit or static implicit.

17. The computer program product of claim 10, further comprising:

a fifth computer readable program code means for causing the computer to detect instances where a particular file of said plurality of files has a different attribute or attributes corresponding to a plurality of hardlinks referencing said particular file; and a sixth computer readable program code means for causing the computer to report said instances in response to a user request.

* * * * *